UNITED STATES PATENT OFFICE.

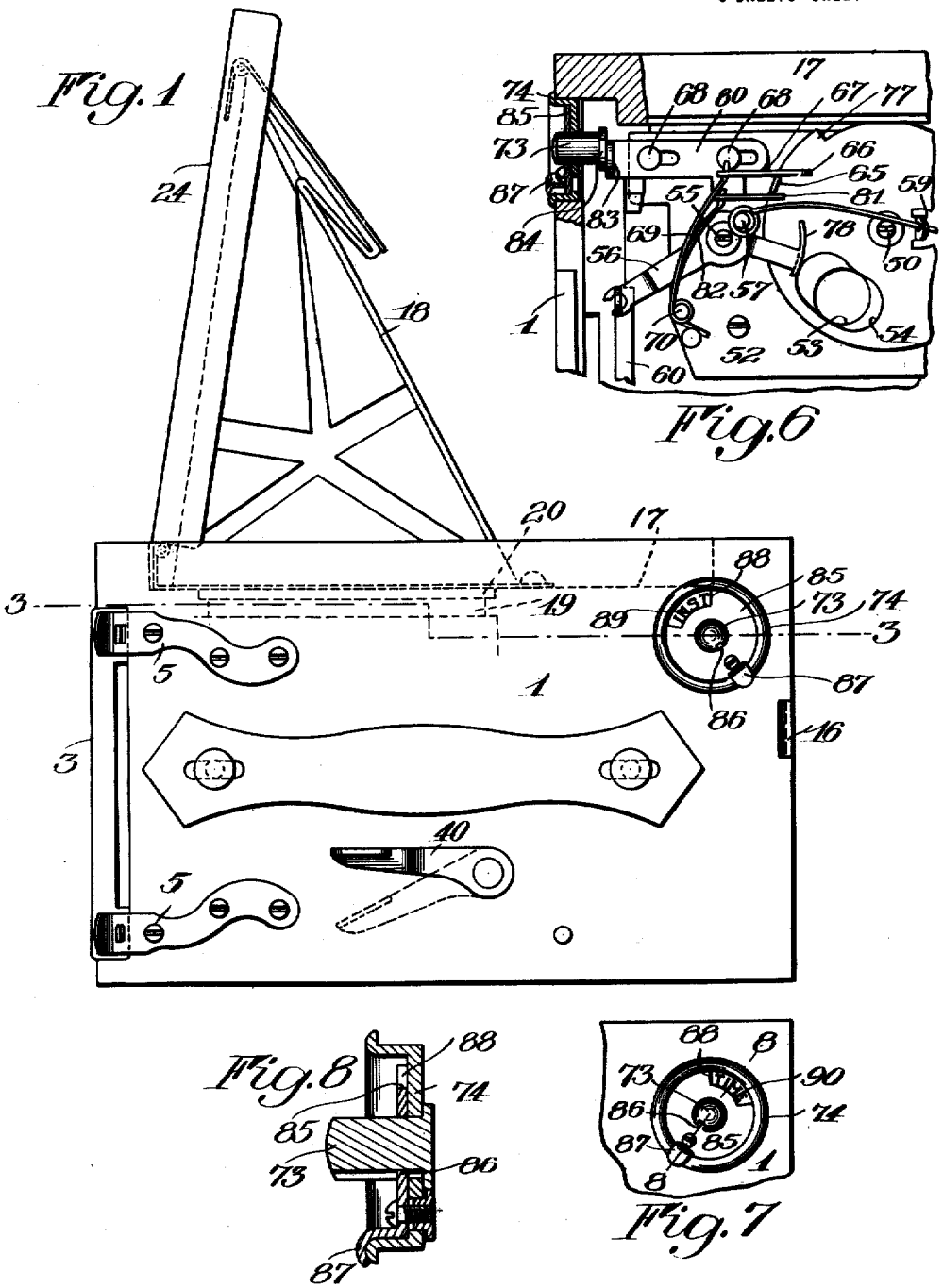

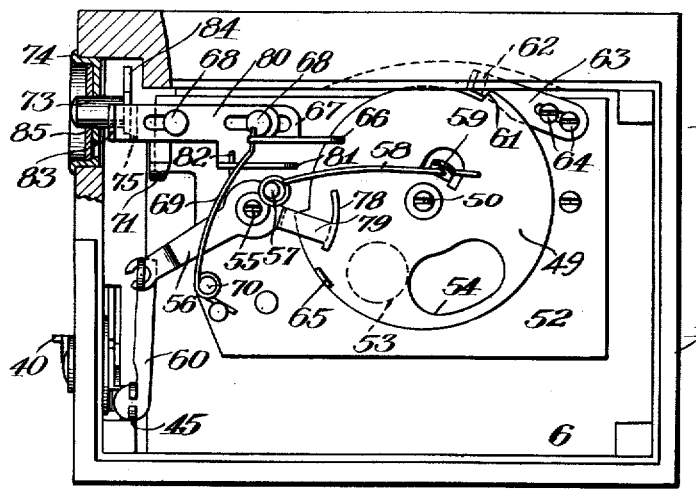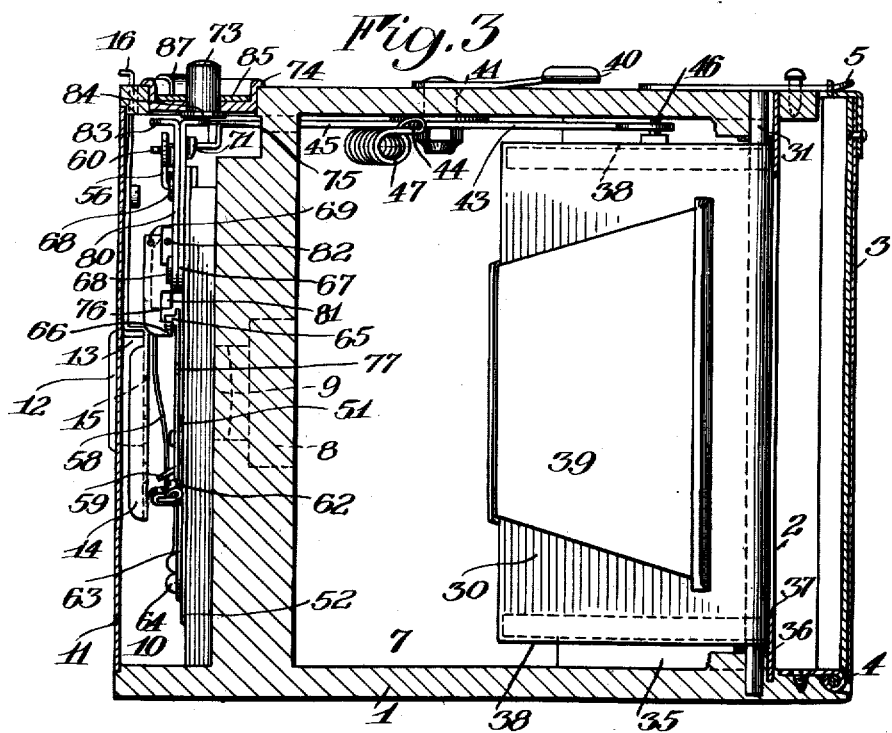

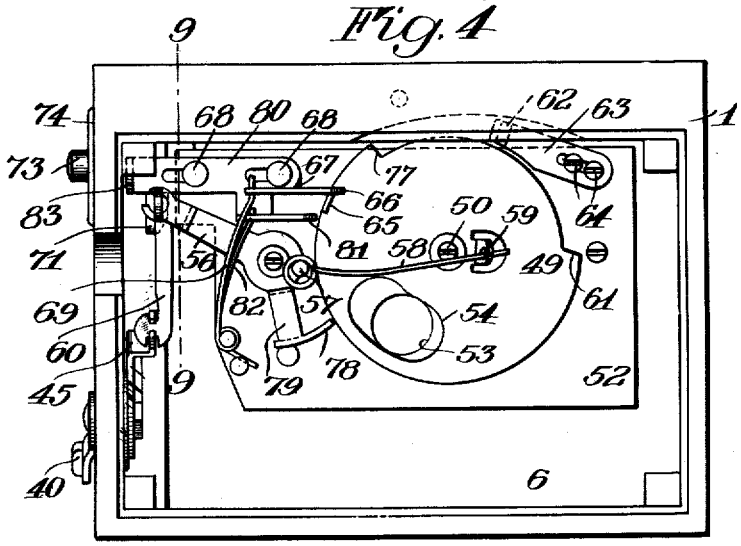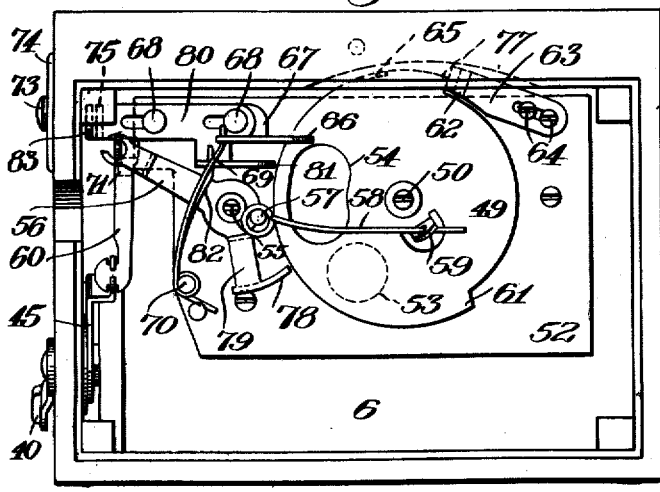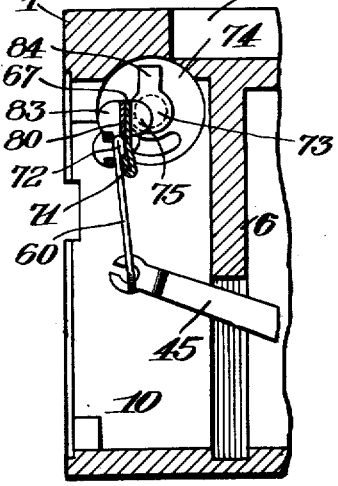

ALFRED A. RUTTAN AND GEORGE I. KESTER, OF ROCHESTER, NEW YORK, ASSIGNORS TO EASTMAN KODAK COMPANY, OF ROCHESTER, NEW YORK, A CORPORATION OF NEW YORK.

CAMERA-SHUTTER.

1,319,905. Specification of Letters Patent. Patented Oct. 28, 1919.

Original application filed June 7, 1917, Serial No. 173,381. Divided and this application filed June 7, 1918. Serial No. 238,630.

*To all whom it may concern:*

Be it known that we, ALFRED A. RUTTAN and GEORGE I. KESTER, of Rochester, in the county of Monroe and State of New York, have invented certain new and useful Improvements in Photographic Shutters; and we do hereby declare the following to be a full, clear, and exact description of the same, reference being had to the accompanying drawings, forming a part of this specification, and to the reference numerals marked thereon.

Our present invention relates to photography and more particularly to photographic camera shutters and it has for its object to provide a simple and efficient shutter and, further, one well adapted to act in harmony with the flap or mirror of a reflex or lens focusing camera for which purpose the shutter mechanism is specially constructed. The improvements are further directed toward the devices whereby the shutter is controlled for time and instantaneous exposures, a simple, effective and conveniently arranged operating member being provided for this purpose and to these and other ends the invention resides in certain improvements and combinations of parts all as will be hereinafter more fully described, the novel features being pointed out in the claims at the end of the specification.

In the drawings:

Figure 1 is a side elevation of a camera provided with a shutter constructed in accordance with and illustrating one embodiment of our invention;

Fig. 2 is a front view of the shutter and connected parts, partially in section;

Fig. 3 is a horizontal section through the camera taken substantially on the line 3—3 of Fig. 1;

Fig. 4 is a front view of the shutter similar to Fig. 2 but showing it set for an instantaneous exposure;

Fig. 5 is a view similar to Fig. 4 but showing the shutter blade closed preliminary to an instantaneous exposure;

Fig. 6 is a fragmentary view similar to Fig. 2, partially in section, showing the shutter open during the progress of the time exposure;

Fig. 7 is a detail elevation of the shutter tripping means adjusted for a time exposure;

Fig. 8 is an enlarged detail section taken substantially on the line 8—8 of Fig. 7, and Fig. 9 is a detail fragmentary section taken substantially on the line 9—9 of Fig. 4.

Similar reference numerals throughout the several views indicate the same parts.

We have illustrated our improvements in the present instance in connection with a reflex box camera of the lens focusing type provided with a focusing hood and a swinging mirror, the exposure being controlled by the shutter and not by the mirror, and the focusing screen being at the top of the camera and the plate or film holder at the rear. The camera is described in detail and claimed in its general combination with the shutter in our prior application Serial No. 173,381, filed June 7, 1917, of which this application is a division so it may be only briefly outlined herein. It comprises a body 1 having a seat 2 at the rear (Figs. 1 and 3) for the sensitive material which latter is held and covered by a back 3 hinged at 4 and secured by spring catch 5. Between the said seat and the front wall 6 is comprised the exposure and mirror chamber 7, the front wall 6 being provided with the usual lens opening 8 and lens 9. A shutter chamber 10 is provided between the forward wall 6 and a front cover 11, the latter being provided with a central lens opening 12 in a bushing 13. A diaphragm slide 14 provided with a plurality of different sized openings 15 and coöperating with the rear of the bushing regulates the volume of light and is operated by a finger portion 16 (Figs. 1 and 3) projecting to the exterior of the camera.

At the top of the body 1 is a well or chamber 17 for the focusing hood 18 attached to a cover 24 and in the bottom of this well and in the top of the exposure and mirror chamber 7 is a focusing opening 19 fitted with a ground glass or other focusing screen 20. The focusing opening 19 is normally sealed against the entrance of light through the focusing screen 20 by a mirror frame 30. This mirror frame swings on a shaft 31 extending transversely of the body 1 at the upper rear corner of the chamber 7 and is in its inoperative position when sealing the opening 19. When in its operative position shown in Fig. 3, a mirror 39 carried on the front and top of the mirror frame 30 is suitably inclined to reflect the image cast by the lens 9 upon the screen 20, as usual, and at the same time seal the seat 2 for sensitive material from exposure to light.

Still referring more particularly to Figs. 1 and 3, the mirror frame and mirror are manipulated by means of an operating lever 40 on the exterior of the camera body 1. This lever is fixed to a stud shaft 41 journaled in a wall of the body and on its inner end is fixed a plate 42 having three diverging arms 43, 44 and 45. The arm 43 has a sliding pivotal connection with the mirror frame 30 and when the exterior operating arm 40 is depressed from the full line position of Fig. 1 to the dotted position, the mirror and frame are swung from the inoperative position downwardly to the operative position. This is accomplished against the tension of a main actuating spring 47 that is connected to the arm 44 at one end and to a wall of the chamber 7 at the other. The tendency of this spring therefore is to actuate the mirror frame from operative position to the inoperative position and close the focusing opening 19. The third arm 45 constitutes a shutter actuating connection and it is through this arm that the mirror is held in operative position against the tension of spring 47, as will be presently described.

The shutter mechanism is mounted, in the present instance, on the front wall 6 of the body 1 and chamber 7 and within the forward chamber 10. Before going into the details of its construction, we may state that we have so correlated the shutter and mirror and their controlling devices that both are set by means of the operating member 40; both are actuated by the main spring 47; both are released by the same tripping device, and while the shutter is normally closed, it is always open for focusing when the mirror is in operative position yet closes preliminarily to its exposing movement as the mirror is passing to its inoperative position to seal the focusing opening 19 and permit the lens to cast the image upon the sensitive material.

For the details of the shutter mechanism reference may now be had more particularly to Fig. 2 which shows it in normal position. The shutter blade 49 is, in the present instance of the rotary disk type and turns upon a pivot screw 50 mounted in a bushing 51 in the wall 6. It turns against a raised plate 52 offset from said wall 6 having an opening 53 coincident with the lens opening 8 and lens 9 and an opening 54 in the shutter blade passes into and out of register with this opening 53 as the blade is rotated. Normally, it is out of register as before mentioned and as shown in Fig. 2. Pivoted to the plate 52 at 55 on one side of the blade pivot 50 is a lever 56 having secured thereto at 57 one end of a spring arm 58. The other end of said arm has sliding engagement with a perforated ear 59 on the blade 49 on the opposite side of the pivot 50 thereof. The lever 56 is pivotally connected by means of a link 60 with the forward end of arm 45 on the operating shaft 41 and in the position of Fig. 2, the main spring 47 is holding the mirror 39 up or in inoperative position and has rocked this arm 45 to a lowered position. When so lowered, the shutter lever 56 places the spring arm 58 under tension for upward thrust so that a shoulder 61 on the shutter blade 49 is held against a stop ear 62 on a plate 63 adjustably connected at 64 to the mounting plate 52 and the shutter is held closed. At this time the operating member or setting lever 40 is raised, as shown in Fig. 2 and in full lines in Fig. 1. Upon depressing this operating member to set the mirror in operative position for focusing, the arm 45 is raised against the tension of the main actuating spring 47 to the position of Fig. 4. This rocks the shutter lever 56 in a closkwise direction and reverses the tension on the spring arm 58 which carries the shutter blade 49 in a clockwise direction and opens the shutter, as shown in said last mentioned figure. As the shoulder 61 leaves the stop 62, the blade is halted with the opening 54 thereof in register with the lens opening 53 by the engagement of a stop ear 65 with a detent 66 consisting of a flange on a sliding plate 67 movable back and forth on guide pins 68 on the plate 52. The detent is held in the path of the stop ear 65 by a spring 69 secured to the plate 52 at 70 that throws the detent plate 67 to the left and carried on this plate is another detent or catch shoulder 71 shown in Fig. 9 which is engaged by a shoulder 72 on the rear side of the upper end of link 60 when the arm 45 is raised. The link is so engaged in Fig. 4 when the shutter stop 65 is against detent 66 holding the shutter open. The mirror is now in operative position and the main spring 47 is held under tension by the said detent 71 so that focusing may be proceeded with.

It will also be noted from Fig. 4 that the spring arm 58 has not only opened the shutter but is still under tension while the mirror is in position for focusing. A push button 73 (Figs. 2, 3 and 9) mounted in a bushing 74 in a wall of the camera is in alinement with the flanged end 75 of detent plate 67 and pressure upon this button effects an exposure. As the button is operated, the detent plate 67 is thrown to the right in Fig. 4 with the result that the stop ear 65 on the shutter blade becomes disengaged from the detent 66 and passes through a notch 76 therein, clearly shown in Fig. 3. Spring arm 58 thereupon immediately closes the shutter in a clockwise direction as shown in Fig. 5 and holds it closed with a shoulder 77 thereon in engagement with the stop 62. This occurs before the detent plate 67 has moved far enough to slide the detent 71 thereon (Fig. 9) from beneath the shoulder 72 on the link 60 so that the shutter will be closed and seal the camera from the entrance of light at the front before the mirror frame 30 can leave the operative inclined position. At the completion of the movement of the detent plate 67 by the button 73, the detent 71 is, however, disengaged with the result that the main actuating spring 47 comes into play and instantly swings the mirror frame 30 to the raised position sealing the focusing opening 19. The arm 45 moves downward and, through the link 60, rocks the shutter lever 56 in a counter-clockwise direction, again reversing the tension on spring arm 58 and causing it to open and then close the shutter, the movement being from the position of Fig. 5 back to the normal position of Fig. 2. The detent plate 67 being still pushed to the right, there is nothing to obstruct this opening and closing movement of the shutter blade in the counter-clockwise direction as the stop ear 65 can still pass through the notch 76 in the detent.

Bearing in mind that the shutter is normally closed as in Fig. 2, it will be noted that the shutter is first opened in one direction by the operating lever 40 through the medium of the spring arm 58; is then closed by the spring arm 58 acting alone and in the same direction and is then opened and closed by the main spring 47 acting through the medium of the spring arm 58 in the opposite direction.

During the setting movement (Fig. 2 to Fig. 4) it is, of course, necessary that the shutter shall open for focusing only after the mirror frame 30 has reached its operative inclined position and is prepared to prevent access of light to the sensitive material in seat 2 yet the shutter is opened and the mirror carried downward by means of the one operating member 40. We therefore provide means for slightly delaying the opening of the shutter and this means consists, in the present instance, of a segmental shoe 78 carried on an arm 79 of the shutter lever 56. As the latter is rocked from the position of Fig. 2 during the setting movement, this shoe crosses the path of the stop ear 65 on the blade 49 and is engaged by said ear to maintain the shutter closed until the spring arm 58 is placed under tension and the mirror frame has reached its seat at the upward limit of movement of the setting arm 45 and the shutter lever 56, as in Fig. 4, whereupon the stop 65 slips off of the shoe 78 and engages the detent 66.

Mounted on the same guide pins 68 as is the detent plate 67 is another detent plate 80 having a detent flange 81 and normally pressed to the left by a spring arm 82 also secured at 70. This plate overlies the plate 67 and at its outer end is provided with a flange 83 (Figs. 3 and 9) similar to but projecting in an opposite direction from the flange 75 on the plate 67. The push rod or button 73 is rotatable as well as slidable in the bushing 74 and is provided with a laterally extending foot 84 at its inner end. When the button is turned so that this foot is upward as in Fig. 9, the button will actuate only the detent plate 67 but when it is rotated a quarter turn to the right, the foot 84 comes opposite to the flange 83 on the plate 80 and that is actuated also when the button is pressed in, as shown in Fig. 6. But the abutment 66 projects farther into the path of the stop ear 65 than does the abutment or detent 81 and therefore the stop ear 65 is always halted by the detent 66 when rotating to the right to hold the shutter open as in Fig. 4. When, however, the shutter is set and closed as in Fig. 5 and the button is in position to carry the detent 81 inward, the return movement of the shutter blade 49 to open and close the shutter and make the exposure is halted with the shutter open as in Fig. 6, by the engagement of ear 65 with abutment 81, as also shown in said figure, the said detent 81 thus acting as a timestop and producing a time exposure. The button is held at rest during the period of exposure and when released, the detent 81 is withdrawn by its spring 82 and the stop ear 65 liberated, permitting the completion of the blade movement and the closing of the shutter as before.

To indicate whether the button 73 is set for a time or instantaneous exposure, it is encircled by a disk 85 that is keyed to it at 86 for rotation but through which it is adapted to slide. This disk has a finger portion 87 and a segmental opening 88 and on the bottom of the bushing 74 are two designations 89 and 90 (Figs. 1 and 7) for instantaneous and time exposures, respectively. When the disk is turned as in Fig. 1, so that the designation 89 is visible, the foot 84 is out of register with the time detent plate 80 and when the disk is turned as in Fig. 7, to expose the designation 90, the ear is in register with the plate and ready to operate both it and the plate 67 for a time exposure.

We claim as our invention:

1. The combination with a shutter having a normally closed position, an actuating spring for opening and closing it, and a setting means, of a detent for holding the shutter open, and a spring operating to open the shutter under the influence of the setting means and for closing it when the detent is released.

2. The combination with a shutter having a normally closed position, an actuating spring for opening and closing it, a setting means, and a detent for holding the shutter open and the spring under tension, of a spring operating to open the shutter under the influence of the setting means and to close it when the detent is released.

3. The combination with a shutter having a normally closed position, an actuating spring for opening and closing it and a setting means adapted to initially open the shutter, of a detent for holding the shutter open and for restraining the actuating spring.

4. The combination with a shutter having a normally closed position, an actuating spring for opening and closing it in one direction, a spring for closing it in the other direction and a setting means adapted to initially open the shutter in said last mentioned direction, of a detent for holding the shutter after its initial opening and closing and adapted when released to permit its opening and closing in the other direction.

5. The combination with a shutter having a normally closed position, an actuating spring for opening and closing it in one direction, a spring for closing it in the other direction and a setting means adapted to initially open the shutter in said last mentioned direction, of a detent for holding the shutter after its initial opening and closing and adapted when released to permit its opening and closing in the other direction, a time stop for holding the shutter in open position in the last mentioned direction of movement, an operating member for the detent and stop and means for shifting the time stop into and out of the control of the operating member.

6. The combination with a shutter having a normally closed position, an actuating spring for opening and closing it in one direction, a spring for closing it in the other direction and a setting means adapted to initially open the shutter in said last mentioned direction, of a detent for holding the shutter after its initial opening and closing and adapted when released to permit its opening and closing in the other direction, a time stop for halting the shutter in the open position in the last mentioned direction of movement, a push rod for operating the detent and stop and a rotary indicator surrounding the push rod and adjustable to connect or disconnect the latter and the time stop.

ALFRED A. RUTTAN.
GEORGE I. KESTER.